Sept. 23, 1958  R. P. SCHOLFIELD ET AL  2,853,353
FILING APPARATUS
Filed Feb. 4, 1954  4 Sheets-Sheet 1
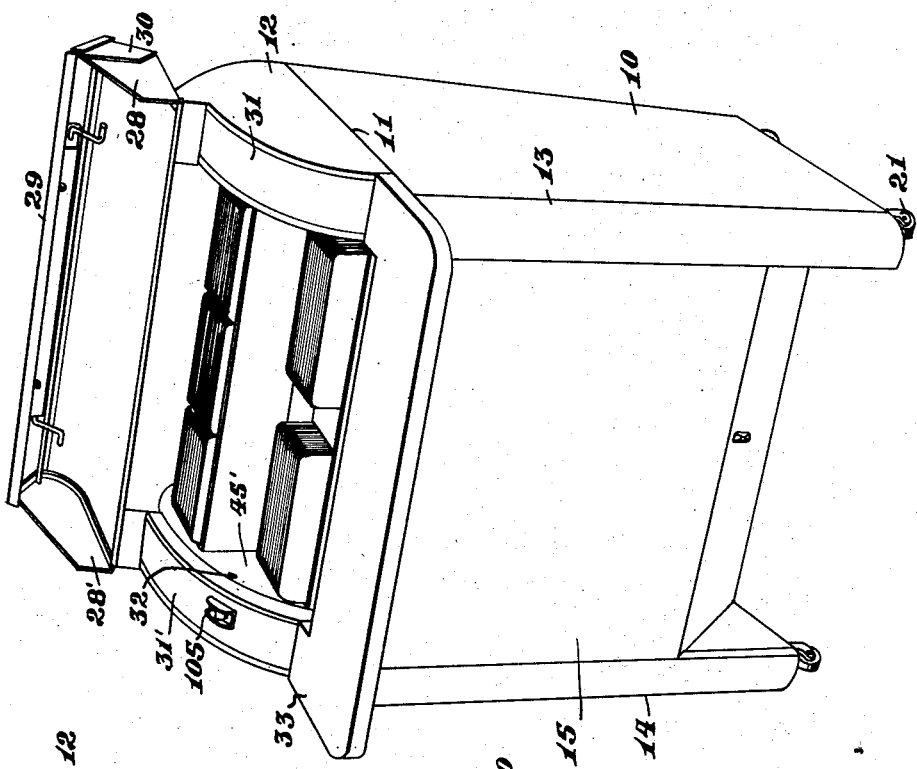
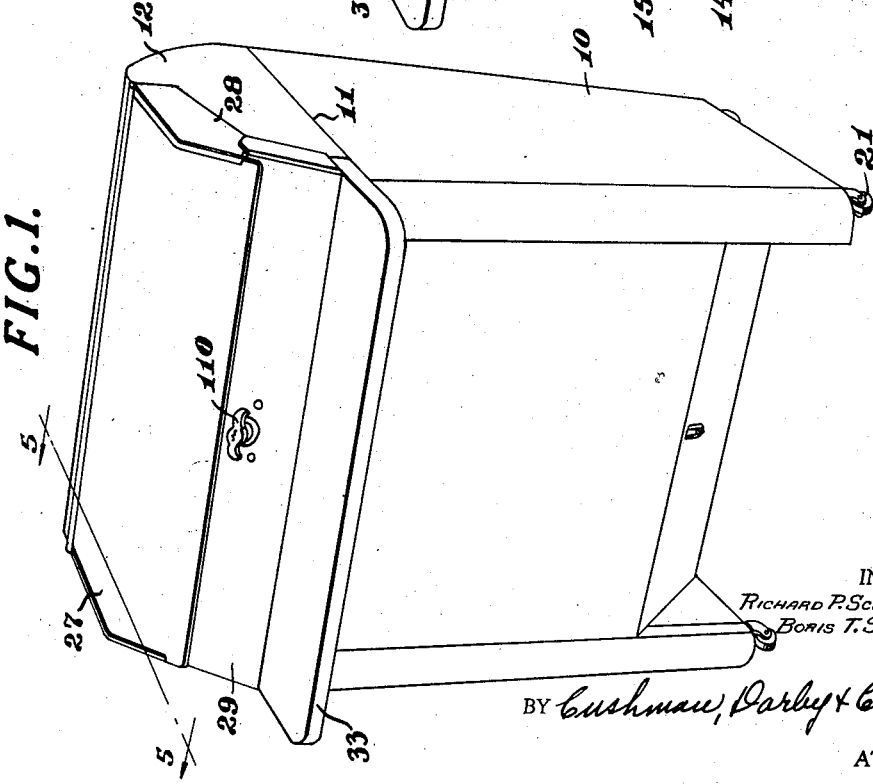
INVENTORS
RICHARD P. SCHOLFIELD
BORIS T. SMIRNOFF
BY Cushman, Darby & Cushman
ATTORNEYS

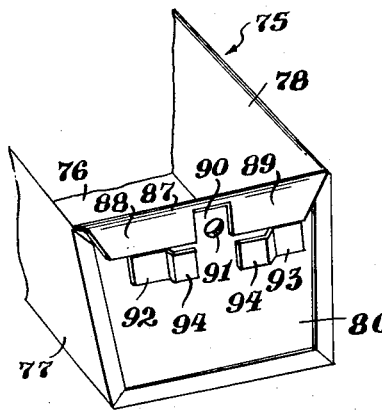
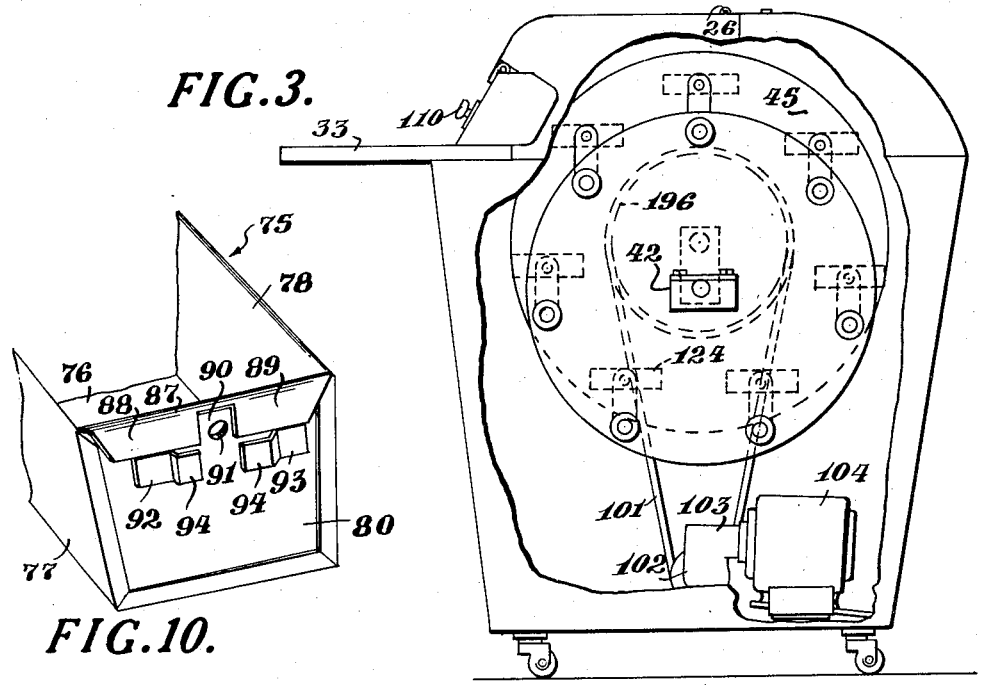
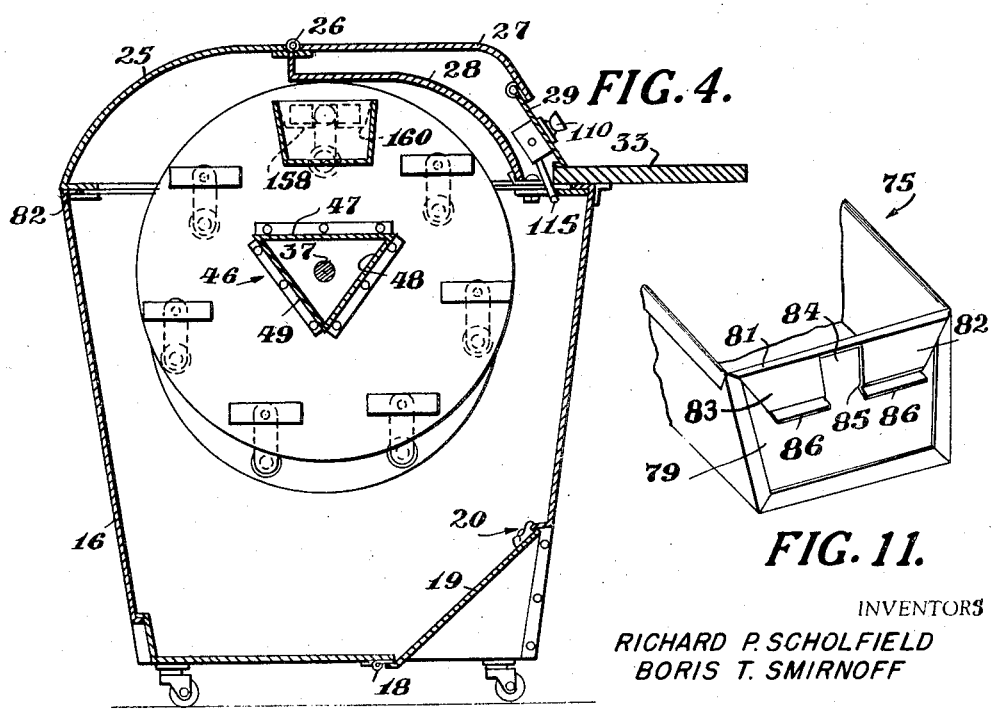

Sept. 23, 1958 R. P. SCHOLFIELD ET AL 2,853,353
FILING APPARATUS
Filed Feb. 4, 1954 4 Sheets-Sheet 3

INVENTORS
RICHARD P. SCHOLFIELD
BORIS T. SMIRNOFF
BY Cushman, Darby & Cushman
ATTORNEYS

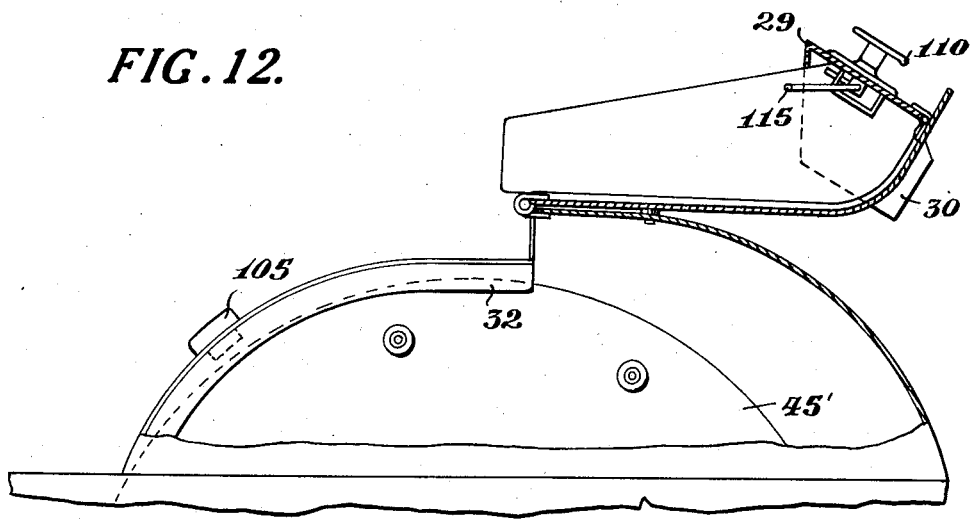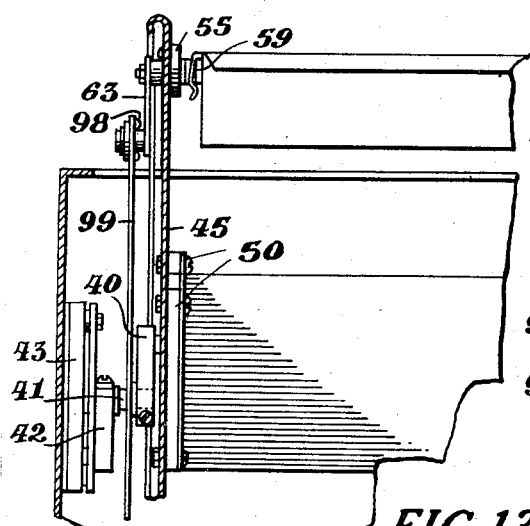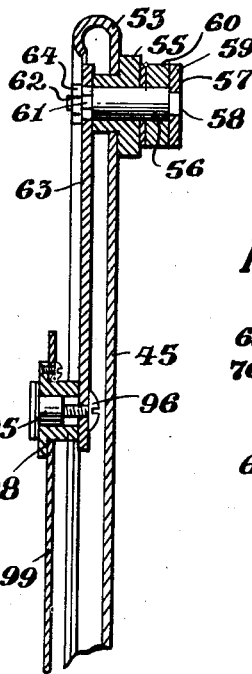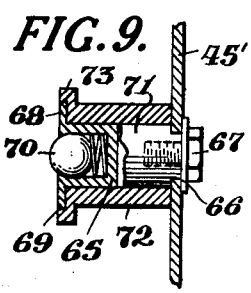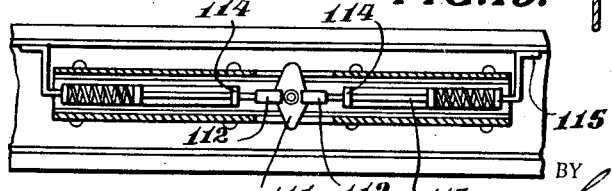

United States Patent Office 2,853,353
Patented Sept. 23, 1958

2,853,353
FILING APPARATUS

Richard P. Scholfield and Boris T. Smirnoff, White Plains, N. Y., assignors to Wheeldex Manufacturing Co., Inc., White Plains, N. Y., a corporation of New York Application February 4, 1954, Serial No. 408,162

6 Claims. (Cl. 312—267)

The present invention relates to filing equipment for use in offices and the like, of the type in which a great plurality of filing cards or the equivalent are mounted in or upon trays or receptacles for movement to and from a position of access by an operator. More particularly, the invention relates to apparatus of this kind which is power driven, to facilitate movement of the cards or other material to the desired position.

The principal object of the invention is to combine in an apparatus of the type referred to, features which result in optimum simplicity and economy of manufacture, yet which facilitate the storage and handling of a maximum number of cards in a given space.

Another object of the invention is to provide improved means for supporting the trays or receptacles so that they may be quite readily removed from the apparatus when desired and replaced therein.

Another object is to provide improved means for supporting the trays for translational movement along a closed, circular path to and from a position of access by the operator, and to provide improved means for stabilizing the trays during such movement; that is, to prevent swinging, rocking, pivoting, or overturning movement of the trays throughout their movement along their orbit, and to maintain them at all times in a constant relation to the horizontal.

Another object of the invention is to provide an improved tray or receptacle construction, cooperating in a novel manner with the tray-supporting means, to prevent inadvertent dislodgment of the trays and to facilitate their installation and removal when desired.

Another object of the invention is to provide simplified and improved housing or cabinet features, cooperating in an improved manner with the card holding and moving means.

Other and further objects and advantages of the invention relate to details of construction and particular combinations of parts, and will be apparent from a consideration of the following description of a specific embodiment of the invention shown in the accompanying drawings, in which Figure 1 is a front elevation of the apparatus with the cover closed;

Figure 2 is a similar view with the cover open, showing one card-carrying tray or receptacle in the normal working position, for access by an operator and another tray immediately therebehind, where its contents still may be inspected;

Figure 3 is a right-hand end elevation of the apparatus with a major portion of the side wall broken away to expose the parts immediately therebehind;

Figure 4 is a central vertical section looking toward the right-hand end of the casing, with all but one tray or receptacle removed;

Figure 7 is a fragmentary section of the right-hand end of the receptacle carrier and associated parts, looking from the rear toward the front;

Figure 8 is a similar view on an enlarged scale of certain details;

Figure 9 is a section and elevation of one of the headed studs and rotatable sleeves constituting the supports for the left-hand ends of the trays or receptacles;

Figure 10 is an end elevation of the left-hand end of one of the trays or receptacles;

Figure 11 is a similar view of the right-hand end thereof;

Figure 12 is a fragmentary vertical section showing the cover of the casing in open position, and Figure 13 is an inverted plan view, partly in section, of the cover locking mechanism shown in Figure 12, in the release position.

Figure 5:
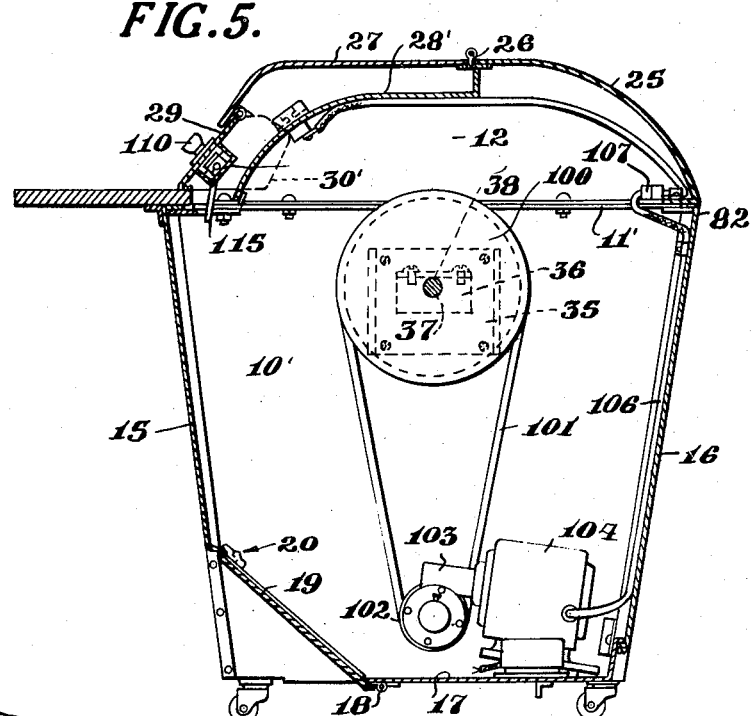
Figure 5 is a similar section looking in the opposite direction, toward the left-hand end of the casing.
Figure 6:
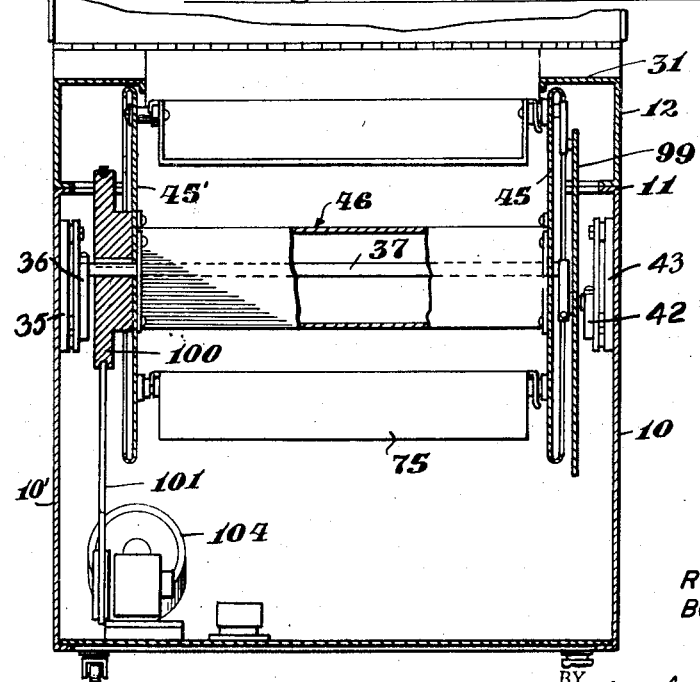
Figure 6 is a vertical section taken at right angles to Figures 4 and 5, substantially through the axis of the tray or receptacle carrier.

The casing of the present apparatus may be made of suitable sheet metal plates secured to angle iron frame members or the like, appropriately welded to each other and reinforced where necessary, but not shown in detail in the accompanying drawings, since such features are understood by those skilled in the art and do not form a part of the present invention.

The casing comprises a main, right-hand end wall 10 extending upwardly to an inwardly flanged upper edge 11, upon which the smaller, upper right-hand end section 12 is supported. The left-hand end is similarly constructed and may comprise similar parts, designated by corresponding primed numbers. Front, rounded, substantially upright, corner pieces 13 and 14 are interconnected by a fixed front panel 15, while the rear is closed by a panel 16. A floor 17, suitably connected to the side panels 10 and 10' and to the rear panel 16 carries at its forward end a hinge 18, to which an access door 19 or lower front wall section is connected, for downward swinging motion when a latch 20 is released. The lower frame, to which the side, corner, back, and floor panels are connected, is supported by conventional casters 21, to facilitate movement of the apparatus from place to place.

At the upper end of the rear panel 16, there is supported in fixed relation, a forwardly extending, curved rear top section 25, connected to or integral with the upper side sections 12 and 12'. At its forward edge, the section 25 carries a hinge 26, to which the forward cover section 27 is secured. The latter section 27 has depending end walls 28 and 28' disposed, when closed, in overlapping relation to the end walls 12 and 12', as shown in Figures 1 and 5. To the forward edge of the cover section 27, there is hingedly connected a closure plate 29, for inward or rearward swinging movement, as shown in Figures 2 and 12. The ends of plate 29 carry closure wings 30 and 30', disposed in overlapping relation to the end members 28, 28', and 12 and 12', so that, when the cover is closed the access opening at the upper, forward quadrant of the casing is completely enclosed.

The forward, curved edges of the upper end panels 12 and 12' are connected to inwardly projecting, curved guard plates 31 and 31' which substantially enclose certain moving parts as hereinafter explained. The inwardly extending guard plates 31, 31' have downwardly projecting marginal flanges 32 (Figures 2 and 12) for a purpose hereinafter explained. A working shelf 33 projects forwardly from the front of the apparatus at substantially the elevation of the upper edges 11 of the end sections 10 and 10' and of the front section 15.

Adjacent the inner face of the left-hand end wall 10' is a frame plate 35 carrying a bracket 36, serving as a support for the left-hand end of a rod or stationary shaft 37, held in the bracket by a clamp plate 38. The other end of the shaft 37 is clamped in an upwardly projecting arm 40 (Figure 7) having its lower end secured to a stub shaft 41 carried by a bracket 42, similar to the bracket 36 and secured to a frame plate 43.

Journalled upon the stationary shaft 37 are a pair of carrier disks 45 and 45' interconnected by a central hub-like brace member 46, which may be triangular in cross-section and may consist of three plates 47, 48, and 49, connected to the disks by flanges or angle strips and spacer plates 50, as shown in Figures 4 and 7. Thus, the rotary carrier for the card trays or receptacles comprises a pair of disks 45 and 45' interconnected by a central hub or frame 46, the disks being journalled for rotation in unison upon a stationary shaft 37 by bearing assemblies 51 and 52.

Each of the disks 45 and 45' is strengthened by a peripheral reinforcing bead 53 or 53'.

Suitably secured in the disk 45 at the right-hand end of the apparatus are a plurality of receptacle supporting and stabilizing assemblies, one of which will now be described, reference being had to Figures 3, 4, 7, and 8. Each assembly comprises a bushing 55 non-rotatably secured in the disk 45, in which a stub shaft 56 is journalled. The inner end of each stub shaft 56 is provided with a non-circular projection 57, which is centrally bored, tapped, and countersunk, to receive a screw 58. A horizontally extending, tray-supporting arm 59 has an opening midway between its ends, complemental in shape to and disposed in embracing relation with the projection 56. Screw 58 holds the arm in place. One or more spacer washers or collars 60 are interposed between the bushing 55 and arm 59.

The outer end of stub shaft 56 is provided with a reduced, non-circular projection 61, terminating in a threaded extension 62. A lever arm 63 has an opening at its upper end which is complemental in shape and disposed in embracing relation with respect to the projection 61. A nut 64 on the threaded extension 62 secures the lever arm 63 to the stub shaft 56. The purpose of the stabilizing lever arms 63 will be described below.

The left-hand carrier disk 45 carries a support for the left-hand end of each of the trays or receptacles. As shown in Figure 9, each of these supports includes a headed stud 65 having a non-circular projection 66 disposed in a complemental opening in disk 45'. Each stud is bored and tapped, to receive a cap screw 67, to secure the stud to the disk.

At its other end, the stud is provided with a head or flange 68 and with an axial socket 69, in which a ball 70 is disposed, pressed outwardly by a spring 71. As is well understood in the art, the ball is maintained in the socket by an inwardly projecting lip at the outer end thereof.

Journalled upon the stud 65 is a sleeve 72, having a flange or head 73 at its end, and a circular recess in its end face, to receive the flange 68 of the stud.

As shown in Figures 10 and 11, each of the card-carrying receptacles or trays 75 comprises bottom, side, and end walls 76, 77, 78, 79, and 80, respectively. These devices are preferably made of relatively light sheet metal. The right-hand end wall 79, Figure 11, has an outwardly projecting flange 81 at its upper edge and the pair of downwardly turned wings 82 and 83, separated by a gap 84 and having at their lower ends inwardly projecting ribs 85 and outwardly bent terminal portions 86. The wings 82 and 83 are of springy material, and the ribs 85 are adapted to snap over the tray-supporting arms 59 carried by the stub shafts 56, with the spacer collars 60 received in the gap 84. Thus, lateral or vertical movement of the right-hand end of the tray with respect to the supporting arms 59 is prevented, but the tray may be removed by the application of deliberate lifting force.

The other end of each tray, as shown in Figure 10 may include an outwardly projecting flange 87 having a pair of downturned wings 88 and 89, separated by a gap 90. The end wall 80 is provided with a hole or other recess 91, and may also carry a pair of clips 92 and 93, each having a terminal portion 94 spaced outwardly from the end wall itself. This end of each tray is supported upon one of the headed sleeves 72, with the cylindrical portion thereof disposed in the gap 90, and the head 73 projecting under the flange 87 and, at the sides, behind wings 88 and 89. Ball 70 snaps into the hole 91, to prevent inadvertent displacement of the tray.

Referring again to Figures 7 and 8, the depending lever arms 63 carry at their lower ends, headed studs 95 having non-circular projections on their inner ends disposed in complemental openings in the lever arms. Each stud is secured to its lever arm by a cap screw 96 threaded into a tapped bore in the stud. The studs are rotatably mounted in bushings 98 carried by a stabilizing disk 99 journalled upon the stub shaft 41.

Each lever 63 is of the same length, from the centers of the upper and lower openings, as the distance of offset of the centers of shafts 37 and 41.

Hence, the levers 63 will always be maintained in the same angular relation, as the disks 45 and 99 rotate in unison about spaced axes. In the embodiment shown in the drawings, this relationship is vertical, but any other angle could be employed, if desired. As a consequence, the receptacle supporting arms 59 are always maintained in the horizontal position, at all points in their path of revolution about the axis of rod 37 as a center. Thus, overturning and rocking of the trays is positively prevented.

The outer face of the other carrier disk 45 has secured thereto, in slightly spaced relation, a pulley 100, about which is trained an endless V-belt 101, also trained about a lower pulley 102, constituting the driven member of a speed reducer 103, connected to an electric motor 104. The motor is of the reversible type and is controlled by a two-way switch 105 connected to the motor by a cable 106 which may have a separable connector 107 between its ends, to facilitate removal of the cover of the apparatus should occasion demand. The switch and circuit arrangement is such that when the lever of the switch is moved downwardly and forwardly, (Figure 1), the carrier disks are rotated forwardly and when the lever is pushed rearwardly, the carrier rotates in a corresponding direction. When the switch is released, it automatically springs to an intermediate position, whereupon the motor stops. The motor and speed reducer act as a brake when the motor is de-energized. Of course, any suitable brake device could be added, if desired.

The closure panel 29 of the front cover section of the cabinet carries a handle 110 having a double cam plate 111 on its inner end, in engagement with cam following yokes 112, carried by rods 113 slidably mounted in keepers 114 and having downwardly bent and laterally projecting end portions 115. These ends are adapted to project below the rearwardly extending end portions of the shelf 33 and below the adjacent supporting framework, and to be projected laterally thereunder, when the handle is turned, to hold the cover securely in closed position. The handle 102 is provided with a well-known barrel type of lock so that it cannot be turned to release position except by the use of a key.

It is thought that the operation of the apparatus will be apparent from a consideration of the foregoing description. Filing receptacles, mounted upon the carrier disks 45 and 45' may be brought to a position of access adjacent the shelf 33 by manipulating the switch 105. The trays or receptacles are held in the horizontal position by the stabilizing disk 99 and the levers 63, which are continuously maintained in the predetermined desired position.

Although a preferred form of apparatus has been described with considerable particularity in this specification by reference to the accompanying drawings, it must be understood that the invention is not limited to the precise details of construction shown and described, but includes all modifications coming within the scope of the appended claims and their equivalents.

We claim:

1. In a filing appartus, a plurality of horizontally disposed trays, means for supporting said trays for stabilized translational movement along a closed path of travel, said supporting means providing a disengageable connection with both ends of each tray whereby the trays may be individually lifted and removed from said supporting means, said disengageable connection for each tray comprising coaxial horizontally disposed studs extending inwardly toward each end of the tray, each of said studs having rigid elements extending transversely from opposite sides of the inner end thereof, each of said trays having opposite end walls and a pair of horizontally spaced downturned wings connected at their upper ends with each of said end walls to define sockets arranged to receive said rigid elements with said studs extending between said wings, said sockets and rigid elements including interengaging surfaces engageable to prevent relative rotation between the studs and associated trays, and means for yieldingly retaining said rigid elements within said sockets with said interengaging surfaces in engagement.

2. In a filing apparatus, a plurality of horizontally disposed trays, means for supporting said trays for stabilized translational movement along a closed path of travel, said supporting means providing a disengageable connection with both ends of each tray whereby the trays may be individually lifted and removed from said supporting means, said disengageable connection at one end of each tray comprising a headed stud extending inwardly toward the adjacent end of the associated tray and having a spring pressed ball on its inner face, the associated tray at said adjacent end having a down-turned slotted flange arranged to receive said headed stud and an end wall provided with a recess to receive said ball so as to retain the tray end in place through frictional engagement of the ball and recess.

3. A filing apparatus comprising a pair of spaced rigidly interconnected disks mounted for rotation on a common horizontal axis, means carried by said disks for removably supporting the ends of a plurality of filing trays, and a plurality of such trays carried by said means, said supporting means at one of the ends of said trays comprising a plurality of horizontal arms having studs on their back surfaces intermediate their ends projecting through and journalled in the adjacent disk on circumferentially spaced axes, each of said trays at said one end including an end wall, a horizontal flange extending outwardly from the upper portion of said end well, and a pair of horizontally spaced wings extending downwardly from said flange in spaced relation to said end wall and forming with the adjacent portions of said flange and said end wall a socket receiving one of said horizontal arms with the under-surface of said flange resting on the upper horizontal surface of said arm and the associated stud extending between said wings so as to prevent relative rotation between the stud and the associated tray end, and stabilizing means for maintaining all of said arms and trays in horizontal relation and preventing overturning thereof throughout their path of movement about the axis of rotation of said disks, said stabilizing means comprising a stabilizing disk mounted for rotation on a fixed horizontal axis spaced below the first-mentioned axis, and a laterally projecting stabilizing arm fast on the outer end of each of said studs having its lower end pivotally connected on a fixed point with said stabilizing disk.

4. An apparatus as defined in claim 3 wherein the means for supporting the other end of each tray comprises a headed stud projecting inwardly from the adjacent disk, and a spring-pressed ball on the inner face of said headed stud, and wherein each adjacent tray end includes a down-turned slotted flange receiving said headed stud and an end wall provided with a recess receiving said ball so as to retain the tray end in place through frictional engagement of the ball within the recess.

5. In a filing apparatus a plurality of horizontally disposed trays, means for supporting said trays for stabilized transitional movement throughout a closed path of travel, said supporting means providing a disengageable connection with both ends of each tray so that the trays may be individually lifted and removed from said supporting means, said disengageable connection at one end of each tray comprising a horizontal arm having an upper horizontal surface and an inner surface, and a stud extending rigidly from the inner surface of said arm intermediate its ends, each of said trays at said one end having an end wall, a horizontal flange extending outwardly from the upper portion of said end wall, and a pair of horizontally spaced wings extending downwardly from said flange in spaced relation to said end wall and forming with the adjacent portions of said flange and said end wall a socket receiving an associated horizontal arm with the upper surface of the latter engaging said flange and the associated stud extending between said wings so as to prevent relative rotation between said stud and the associated tray end.

6. An apparatus as defined in claim 5 wherein the means for supporting the other end of each tray includes a headed stud having a spring-pressed ball on the inner face thereof, and wherein the other end of each tray includes a downturned slotted flange receiving a headed stud and an end wall provided with a recess receiving the associated ball so as to retain the tray end in place through frictional engagement of the ball within the recess.

References Cited in the file of this patent

UNITED STATES PATENTS

| | | |
|---|---|---|
| 1,030,376 | Boecker | June 25, 1912 |
| 1,189,137 | Klingelhofer | June 27, 1916 |
| 1,227,704 | Ulrich | May 29, 1917 |
| 1,828,208 | Taylor | Oct. 20, 1931 |
| 1,959,926 | Reich | May 22, 1934 |
| 2,125,619 | Parent | Aug. 2, 1938 |
| 2,530,566 | Clark et al. | Nov. 21, 1950 |
| 2,603,547 | Zook | July 15, 1952 |
| 2,646,891 | Morgan | July 28, 1953 |
| 2,710,240 | Berg | June 7, 1955 |
| 2,729,531 | Anderson | Jan. 3, 1956 |
| 2,743,982 | Stingl | May 1, 1956 |
| 2,743,983 | Stingl | May 1, 1956 |